K. A. BECKMAN.
AUTOMATIC SLACK ADJUSTER FOR RAILWAY BRAKES.
APPLICATION FILED DEC. 28, 1914.
1,283,634.
Patented Nov. 5, 1918.
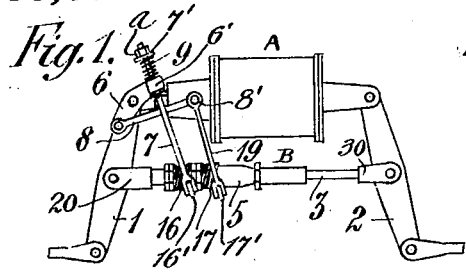
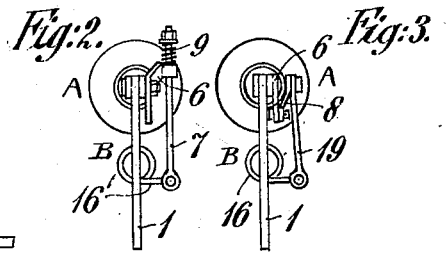
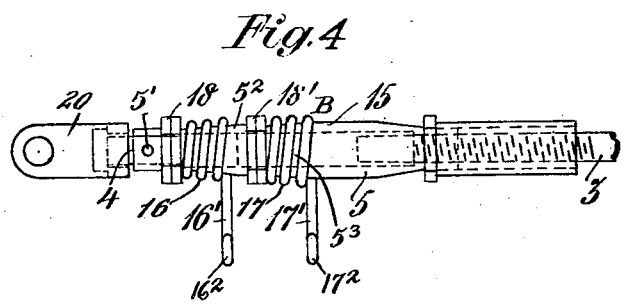
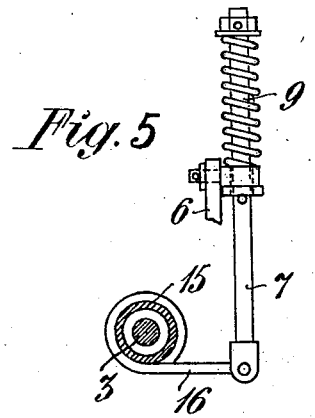
WITNESSES:
INVENTOR
Knut Anton Beckman
BY Carl P. Goepel.
ATTORNEY

UNITED STATES PATENT OFFICE.

KNUT ANTON BECKMAN, OF STOCKHOLM, SWEDEN.

AUTOMATIC SLACK-ADJUSTER FOR RAILWAY-BRAKES.

1,283,634.	Specification of Letters Patent.	Patented Nov. 5, 1918.

Application filed December 28, 1914. Serial No. 879,337.

*To all whom it may concern:*

Be it known that I, KNUT ANTON BECKMAN, a citizen of the Kingdom of Sweden, and resident of Observatoriegatan 22, Stockholm, Sweden, whose post-office address is Observatoriegatan 22, Stockholm, Sweden, have invented certain new and useful Improvements in Automatic Slack-Adjusters for Railway-Brakes, of which the following is a specification.

This invention relates to automatic slack adjusters for railway cars and the like.

The object of the invention is to provide automatically operating mechanism for taking up the slack in the brake mechanism due to wear on the brake shoes and other causes, and also to provide mechanism which will permit the brake shoes when released to move only a constant fixed distance away from the wheels.

On account of a brake mechanism not being an absolutely stiff or rigid system it is impossible that the relative movements of the different members of the device may be determined by geometrical laws alone. Practical trials have also shown that only about ¼ of the stroke of the brake cylinder piston answers to the movement of the brake shoes. The remaining ¾ of the stroke are used for bending, stretching and other deformations of the brake mechanism.

Hence it follows that when the regulating of the slack is made dependent on the travel or stroke of a certain member in the brake mechanism, this must impair the accuracy of the regulating. The stroke of the above mentioned member is also dependent on the power with which the brake is applied on account of the elasticity of the brake mechanism, or, what is the same, the travel or stroke of any member of a brake mechanism corresponds to the sum of the partial strokes during two different periods, of which one lasts from the beginning of the braking until the play or slack is taken up and the other one from this moment until the braking is finished.

The length of the stroke during the first of these periods is dependent on the play only, the length of the stroke during the second period is a function of the braking power and the elasticity in the parts of the brake mechanism placed between the above mentioned member and the brake blocks.

The invention comprises an automatic slack adjuster in the brake applying mechanism constructed and arranged as hereinafter described and claimed.

In order to illustrate the invention there are shown, by way of example, in the accompanying drawings two embodiments of the invention.

Figure 1 shows a plan view of the slack adjusting mechanism disposed between the cylinder levers in an ordinary brake arrangement, and Figs. 2 and 3 show end views of certain parts of the same. Fig. 4 is a side view of the extensible connecting rod connecting the cylinder levers in the embodiment illustrated in Fig. 1, and Fig. 5 a cross-section of the same.

My improved slack adjuster is intended to be applied to a brake applying mechanism of any kind and it can be placed in any suitable position in the same mechanism.

I have not deemed it necessary to illustrate the brake shoes and brake applying mechanism, as the same are well known.

In the embodiment herein illustrated the slack adjuster is applied to an ordinary brake mechanism whereof the cylinder levers 1 and 2, constituting a part of said mechanism, are connected with the brake cylinder A in the usual manner.

These levers 1 and 2 are connected with each other by a compound connecting rod B, which is automatically extensible through the action of the brake mechanism to take up slack in applying the brakes. This extensible connecting rod in the preferred form shown comprises a forked socket 20 pivoted to the lever 1, preferably at about the center of its length, a forked socket 30 pivoted to the lever 2, preferably at about the center of its length, a swiveled rod 4 turnable at its outer end in the socket 20, a screwrod 3 fixed at its outer end in the socket 30, a sleeve 5 fastened at one end by the pin 5' to the swiveled rod 4 and provided at the other end with an interior screw-thread which engages said screwrod 3, said sleeve constituting a single screw turnbuckle. The sleeve 5 has a conical exterior and is provided with collars or nuts 18 and 18'. The inner ends of the swiveled rod 4 and screwrod 3 terminate within the bore of the sleeve 5 leaving sufficient space between them to permit relative adjustment of said parts. As the sleeve is turned the swiveled rod 4 turns with it, but the non-rotating screwrod 3 engaged by the screwthreads of the sleeve is moved endwise thereby.

A helical spring 16 is tightly wound on the cone shaped portion 5² of the sleeve 5 and is under tension between said portion and the collar or nut 18. This spring is provided at its larger end with a tangential extension 16' having an eye 16². This spring is under tension between the enlarged portion of the sleeve and the collar or nut 18 thereof. A helical spring 17 is tightly wound on the cone shaped portion 5³ of said sleeve 5 and is under tension between said cone shaped portion and the nut or collar 18'.

An angular lever 6 is pivoted on the stud which constitutes the connecting pivot between the inner end of the lever 1 and the outer end of the brake piston. This lever has an eye 6' at its inner end. A tension rod 7 is connected at one end to the tangential arm 16' of the spring 16 and slides at its upper part in the eye 6' and is provided at its upper end with an adjustable stop 7' held by a nut a. An expansive spiral spring 9 is disposed on said tension rod between the eye 6' and the adjustable stop 7'. A link 8 connects the outer ends of the lever 6 with a stud 8' fixed on the cylinder and a link 19 connects said stud 8' with the eye 17² of the tangential extension 17' of the spring 17.

In the use of this automatic slack adjuster for railway car brakes, when the brakes are applied, the mechanism first takes up the play room or lost motion constituting the desired slack. As the piston of the brake cylinder moves outward, it carries outward the angular lever 6 and the link 8 connected with the fixed studs 8' causes the eye end of said lever to swing upward against spring 9. The resistance of the spring 9 causes the rod 7 to pull the extension 16' of the helical spring 16 upward. This upward pull on said extension tends to tighten said spring on the sleeve 5 so that sufficient friction is created to cause said sleeve to turn. This turning of the sleeve causes the rod 3 to move outward, whereby the slack is taken up. As the brakes become set the friction between the threads of the rod 3 and sleeve 5 prevent further turning of the sleeve and the further motion of the brake piston to firmly set the brakes is taken up by the spring 9, the eye end 6' thereof moving upward on the rod 7 against the tension of said spring. On the release of the brakes, the cylinder piston moves inward and the angular lever 6 is swung back to normal position, permitting the rod 7 to move downward. This downward movement of said rod pushes the arm 16' downward and this movement tends to loosen the spring 16 and permit it to turn on the sleeve 5. The link 19 connected with the eye 17² of the extension 17' of the spring 17 holds said spring tight on the sleeve 5 and prevents the backward turning thereof during the brake release.

The present slack adjuster is also entirely independent of the playrooms in the bolt holes and the like of the brake mechanism.

Having thus described my invention I declare that what I claim is:—

1. In an automatic slack adjuster the combination of a brake mechanism including a brake cylinder, an angular lever carried by the piston of said cylinder, an extensible connecting rod disposed between levers of said brake mechanism and including a turnbuckle, and an actuating means connecting said angular lever with said turnbuckle for turning it in direction for lessening the slack when the brake is applied, said means having an auxiliary yielding device adapted to take up the excess motion of said actuating means when the frictional resistance of the turnbuckle checks the rotation thereof.

2. In an automatic slack adjuster the combination of a brake mechanism including a brake cylinder, an angular lever carried by the piston of said cylinder, an extensible connecting rod disposed between levers of said brake mechanism and including a turnbuckle, an actuating means connecting said angular lever with said turnbuckle for turning it in direction for lessening the slack when the brake is applied, said means having an auxiliary yielding device adapted to take up the excess motion of said actuating means when the frictional resistance of the turnbuckle checks the rotation thereof, and a stop device for holding said turnbuckle against reverse motion on release of the brakes.

3. In an automatic slack adjuster the combination of a brake mechanism including a brake cylinder, an angular lever carried by the piston of said cylinder and provided with an eye at one end, an extensible connecting rod disposed between levers of said brake mechanism and including a conical turnbuckle, a conical spiral spring wound friction tight on said conical turnbuckle and provided with a lateral extension, a slide rod pivoted to said extension and movable in said eye, a link connecting the other end of said lever with a fixed stud, and a spring disposed on said slide rod above said eye.

4. In an automatic slack adjuster the combination of a brake mechanism including a brake cylinder, an angular lever carried by the piston of said cylinder and provided with an eye at one end, an extensible connecting rod disposed between levers of said brake mechanism and including a conical turnbuckle, a conical spiral spring wound friction tight on said conical turnbuckle and provided with a lateral extension, a slide rod pivoted to said extension and movable in said eye, a link connecting the other end of said lever with a fixed stud, a spring disposed on said slide rod above said eye, and a stop device for holding said turnbuckle against reverse motion on release of the brakes.

5. In an automatic slack adjuster the combination of a brake mechanism including a brake cylinder, an angular lever carried by the piston of said cylinder and provided with an eye at one end, an extensible connecting rod disposed between levers of said brake mechanism and including a conical turnbuckle, a conical spiral spring wound friction tight on said conical turnbuckle and provided with a lateral extension, a slide rod pivoted to said extension and movable in said eye, a link connecting the other end of said lever with a fixed stud, a spring disposed on said slide rod above said eye, and a stop device for holding said turnbuckle against reverse motion on release of the brakes, consisting of another conical spiral spring wound friction tight on said conical turnbuckle and provided with a lateral extension at its larger end and a link connecting said lateral extension with a fixed stud.

6. In an automatic slack adjuster the combination of a brake mechanism including a brake cylinder, an extensible connecting rod disposed between levers of said brake mechanism, and means connected with the piston of said cylinder for extending said connecting rod to lessen the slack when the brakes are applied, said means having an auxiliary yielding device operative to take up the excess motion of parts thereof when the frictional resistance in the rod checks the extension thereof.

7. In an automatic slack adjuster the combination of a brake mechanism, means for setting the brakes, a slack adjuster connected therewith, and an auxiliary yielding device connected with the brake setting mechanism and adapted to take up the excess motion of parts of said mechanism when the frictional resistance of other parts arrests the movement thereof.

In testimony that I claim the foregoing as my invention, I have signed my name in presence of two subscribing witnesses.

KNUT ANTON BECKMAN.

Witnesses:
GRETA PRIM,
SALLY J. WILE.

Copies of this patent may be obtained for five cents each, by addressing the "Commissioner of Patents, Washington, D. C."